United States Patent

Barnett et al.

[11] Patent Number: 5,770,327
[45] Date of Patent: Jun. 23, 1998

[54] SOLID OXIDE FUEL CELL STACK

[75] Inventors: Scott Alexander Barnett, Evanston, Ill.; Tsepin Tsai, Peekskill, N.Y.

[73] Assignee: Northwestern University, Evanston, Ill.

[21] Appl. No.: 911,854

[22] Filed: Aug. 15, 1997

[51] Int. Cl.$^6$ ...................................................... H01M 8/04
[52] U.S. Cl. .............................................. 429/32; 429/34
[58] Field of Search ................................ 429/30, 32, 34, 429/35, 38, 39

[56] References Cited

U.S. PATENT DOCUMENTS

| 4,629,537 | 12/1986 | Hsu | 204/15 |
| 5,350,642 | 9/1994 | Akagi | 429/32 |
| 5,486,430 | 1/1996 | Gorbell et al. | 429/35 |
| 5,549,983 | 8/1996 | Yamanis | 429/32 |

*Primary Examiner*—Anthony Skapars
*Attorney, Agent, or Firm*—Flehr Hohbach Test Albritton & Herbert LLP

[57] ABSTRACT

A solid oxide fuel cell stack having metal interconnects with fuel and oxidant distribution cavities formed by bonding together three stainless steel sheets.

5 Claims, 3 Drawing Sheets

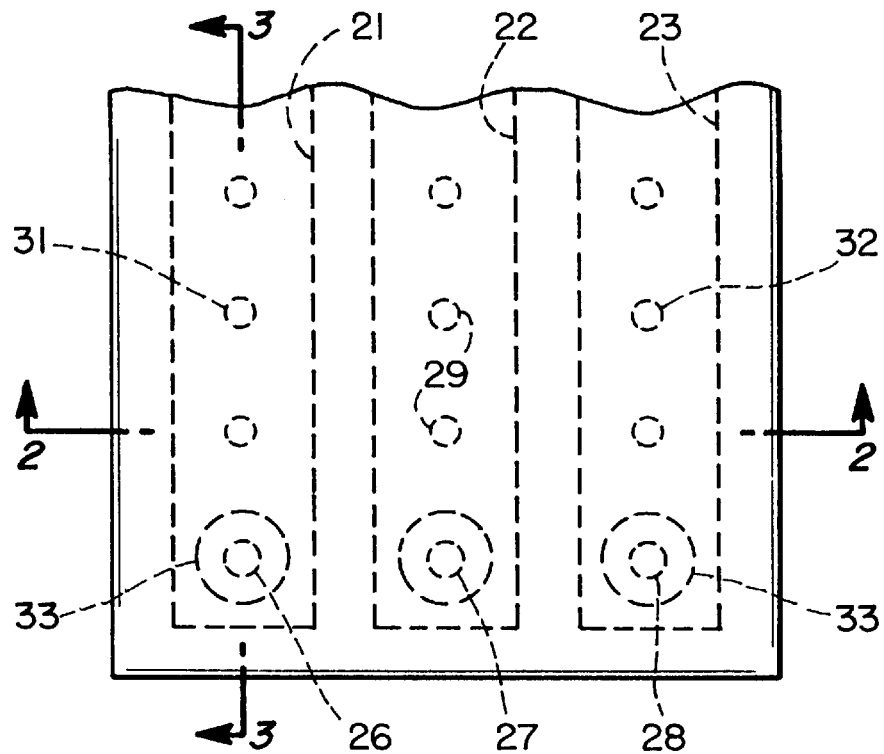
FIG_1
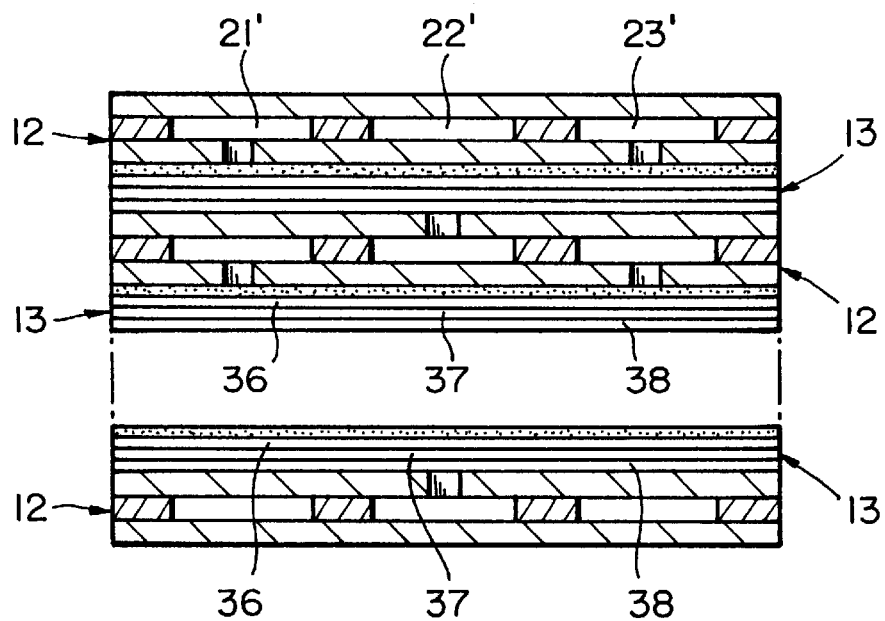
FIG_2

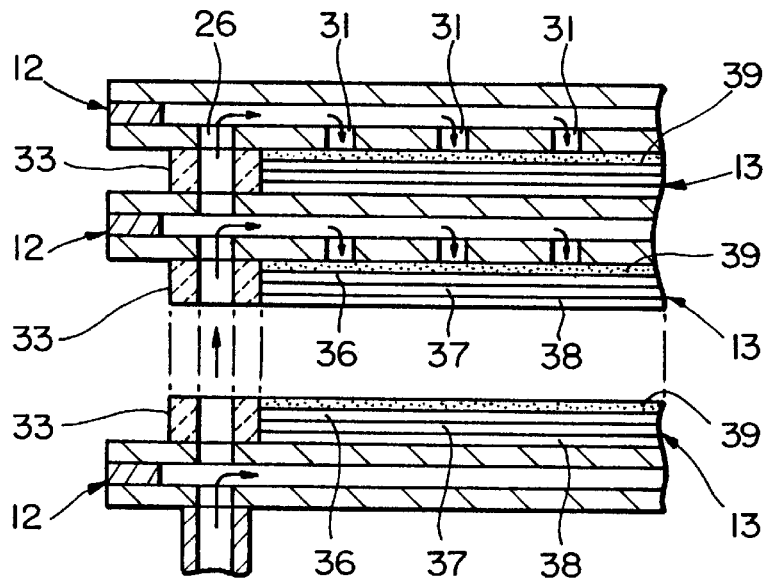
FIG_3
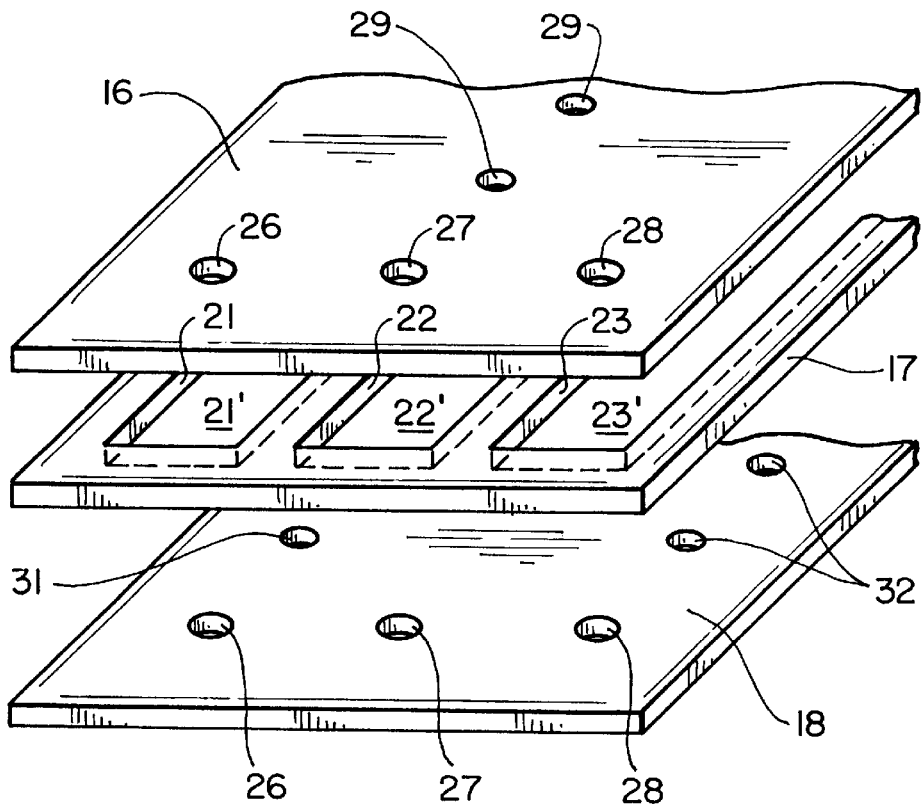
FIG_5

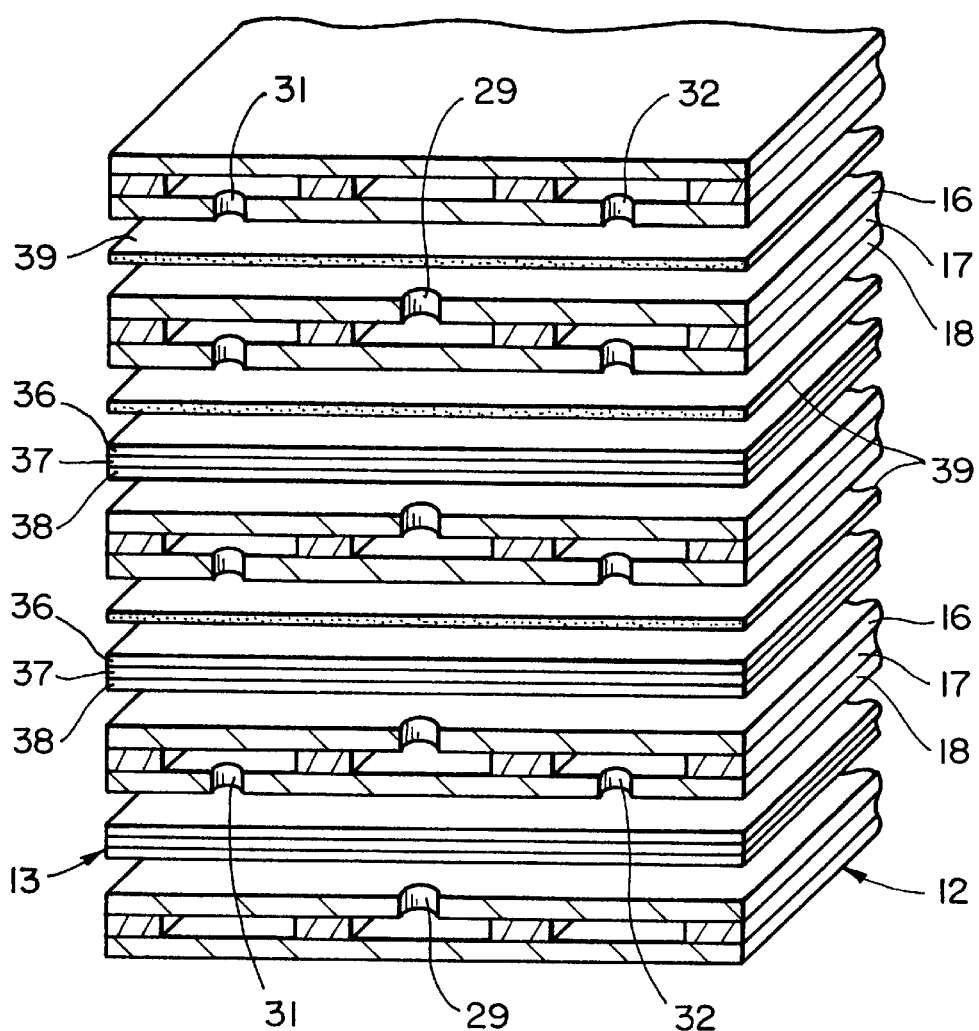
FIG_4
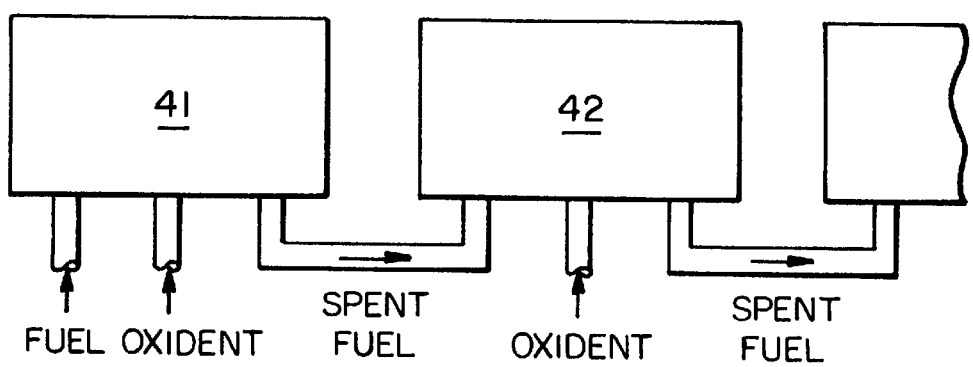
FIG_6

SOLID OXIDE FUEL CELL STACK

BRIEF DESCRIPTION OF THE INVENTION

This invention relates generally to a solid oxide fuel cell (SOFC) stack and more particularly to a SOFC stack employing metal interconnects which are easily fabricated from commercially available metals.

BACKGROUND OF THE INVENTION

A typical solid oxide fuel cell, (SOFC) reacts hydrogen in a gaseous fuel with an oxidant, usually air, to produce electrical energy. Typical fuel cells utilize a natural or synthetic fuel gas containing hydrogen, methane, etc. In order to generate substantial electrical energy, it is necessary to interconnect multiple individual cells in the form of a stack and supply the fuel to the anode and oxidant to the cathode of each individual cell in the stack.

Prior art efforts to provide fuel assemblies or stacks have encountered substantial problems. The interconnects are expensive because of the difficulty in their fabrication. It is difficult to form gas seals which are compatible with the high temperatures at which the fuel cells are operated. The SOFC materials used are fragile and expensive, complicating assembly of the stack.

Recent developments have shown that solid oxide fuel cells based on thin film yttria-stabilized zirconia (YSZ) electrodes can produce high power densities at medium temperatures. A suitable thin film cell is described in co-pending application Ser. No. 08/630,725, filed Apr. 2, 1996.

There is ed for SOFC assembly or stack which uses metallic interconnects, preferably fabricated from commercially available metals, which are relatively inexpensive and easy to fabricate. Furthermore, the metal should be easily sealed to the fuel cells as needed and have a coefficient of thermal expansion near that of the fuel cell material. Assembly of the stack should be uncomplicated.

OBJECTS AND SUMMARY OF THE INVENTION

It is an object of the present invention to provide a SOFC stack which is easy to fabricate and assemble.

It is a further object of the present invention to provide a SOFC assembly which employs easily fabricated metal interconnects.

The objects of the invention are achieved by a solid oxide fuel cell assembly which employs interconnects fabricated from commercially available metal which is compatible with the fuel cell material. The interconnects each have three parallel elongated cavities, the outer cavities have holes which extend to one surface of the interconnect and the holes in the center cavity extend to the other surface of the interconnect. Unit SOFC's are interposed between adjacent interconnects with the anode facing the holes in the outer cavities and the cathode facing the holes in the center cavity of an adjacent interconnect. A manifold introduces fuel gas into one of the outer cavities of the plurality of interconnects forming the fuel cell stack. A manifold introduces a oxidant gas into the central cavity of the plurality of interconnects forming the fuel cell stack. A spent fuel manifold removes spent fuel from the other outer cavity of the plurality of interconnects forming the fuel cell stack. In operation, the fuel gas flows across the anode from one outer cavity to the other and the oxidant flows outwardly across the cathode from the center cavity to the edges of the fuel cell stack.

BRIEF DESCRIPTION OF THE FIGURES

The foregoing and other objects of the invention will be more clearly understood from the accompanying drawings in which:

FIG. 1 is a plan view of a fuel stack in accordance with the present invention.

FIG. 2 is a sectional view taken along the line 2–2 of FIG. 1.

FIG. 3 is a partial sectional view taken along the line 3–3 of FIG. 1.

FIG. 4 is partial exploded perspective view of a fuel stack in accordance with the invention.

FIG. 5 is a partial perspective view of the elements forming an interconnect.

FIG. 6 is a schematic view showing a plurality of interconnected SOFC stacks.

DESCRIPTION OF THE PREFERRED EMBODIMENT

Referring to the figures, the SOFC stack comprises a plurality of interconnects 12 with unit fuel cells 13 between adjacent interconnects 12. Referring particularly to FIG. 5, each interconnect consists of three metal sheets 16, 17 and 18 that are bonded together to form a single piece. The center sheet includes three elongated parallel cutouts, 21', 22' and 23'. When the three sheets are bonded together the cutouts define three elongated cavities 21', 22'and 23'. The upper and lower sheets 16 and 18 include three openings 26, 27 and 28 which open into one end of each of the cavities 21, 22 and 23 respectively. A plurality of holes 29 are formed in the upper sheet and open into the center elongated cavity 21', while a plurality of spaced holes 31 and 32 in the lower sheet open into the outer cavities 22' and 23'.

Preferably the interconnects are stainless steel. The steel should have good strength at temperatures up to 700° C., the thermal expansion coefficient should match that of the fuel cell, i.e. that of yttria-stabilized zirconia, and the oxide scale formed on the steel surface should have sufficient electrical conductivity so that substantial resistance losses do not develop within the stack. A reasonable choice may be ferritic stainless steels. It may be necessary to coat the steel with a conducting ceramic, however, to prevent the formation of a resistive scale. The problem of insulating scale formation on the interconnect is addressed by plasma spray coating the interconnect with a thin dense layer of (La, Sr) $CrO_3$.

Referring to FIG. 3, the stack includes ceramic cylindrical spacers 33 between the interconnects 12 and sealed to the interconnects to form with the opening 26 a manifold which communicates with the adjacent cavities 21' in each of the interconnects. Fuel injected into the manifold flows outwardly from the manifold along the cavities 21', outwardly through the plurality of spaced holes 31 to interact with the anode 36 of the adjacent SOFC cell which includes electrolyte 37 and cathode 38. The gases flow across the anode through Ni felt or mesh 39 and through holes 32 into the cavities 23'. Ceramic spacers (not shown) form a manifold with the openings 28 and the spent fuel flows from the stack through this manifold. Similarly, an oxidant, for example, air, is introduced through a similar manifold associated with the openings 27 into cavities 22' outwardly through the openings 29 adjacent to the cathode outwardly along the cathode 38 to the sides of the stack where it flows freely out of the stack and can be used to burn spent fuel or for preheating the incoming gas.

Electrical contact is achieved between the interconnects and the unit solid oxide fuel cells by pressure. A flexible nickel felt or mesh 39, FIG. 4, is placed between the anodes to maintain uniform contact over the full SOFC interconnect contact area.

Seals are required between the interconnects and the solid oxide fuel cells anode 37 to confine the fuel flow. In addition, sealing of the gas flow in and out along the manifolds is required. Seals are formed between the interconnects and the ceramic spacers. Since the operating temperature is below 700° C., conventional zirconia-based ceramic cements will provide strong, robust, stable seals. Other inexpensive, easily processed, commercial ceramic cements can also be used.

The rectangular shape of the stacks is believed to be an optimal one for low temperature operation. This is in contrast to conventional designs where square shapes are usually favored to minimize the ratio of seal length to seal area. In addition, maximizing unit cell area reduces the number of gas manifolds required, an important consideration for high temperature SOFCs. For low temperature SOFCs, the ease of sealing the gas manifold makes these considerations less important. The cell shape can best be optimized to provide the highest cell performance, minimize temperature differentials and improve heat integration. Note that in the proposed stack geometry, the gas flows across the cell short dimension L. In general, as L is decreased, the cell operating conditions, i.e., temperature and gas composition, become more uniform. The gas flow arrangement is a combination of co- and counter-flow which generally provide relatively good thermal uniformity. Small L values also facilitate heat removal and improve stack efficiency. Heat removal via thermal conduction through the SOFC and interconnects into the surroundings is increased by decreasing L. It may be desirable to enhance this by attaching cooling fins to edges of the metal interconnects. The overall stack efficiency and fuel utilization can be increased by flowing the fuel gas over several small cells compared with one large cell. This is because the temperature and the gas composition change little over each small cell, such that each of the cells can be operated at nearly optimum conditions over its entire area. In contrast, a single large cell is constrained to a single operating voltage that will not be optimal over the full area. The small cell limit can be achieved in the present stack by using small L and by flowing the fuel gas in series from one stack to another until it is nearly fully utilized. This is schematically illustrated in FIG. 6 where the partially spent fuel leaving stack 41 flows into stack 42, etc.

Thus there has been provided a solid oxide fuel cell stack in which the metal interconnects are easily fabricated without machining, reducing fabrication costs. The metal interconnects have a relatively high thermal conductivity in comparison with ceramic minimizing internal heat exchange within the stack. The usual fuel cell flatness requirements are reduced because of the inherent flexibility of the metal interconnects as compared to ceramic interconnects. The stack design features a short gas-flow path across the fuel cell reducing temperature gradients. The gas flow cavities within the interconnect pieces can be used for heat exchange and for reforming hydrocarbon fuel gases. For the latter, a suitable catalysts could be placed within the fuel cavities.

What is claimed is:

1. A solid oxide fuel cell stack comprising:

a plurality of rectangular, metallic interconnects each having three parallel elongated internal cavities, with the center elongated cavity having a plurality of holes extending to one major surface of the interconnect and the outer cavities each having a plurality of holes extending to the other major surface of the interconnect;

a plurality of rectangular fuel cells, each including an anode, a solid electrolyte and a cathode interposed between adjacent interconnects with the anode opposite the holes in the outer cavities of one interconnect and the cathode opposite the holes in the center cavities of the adjacent interconnect;

a fuel manifold for introducing fuel gas into one of the outer cavities so that the fuel gas flows out of the holes in the cavity and across the anode to the holes in the other cavity which collects the spent fuel;

a second fuel manifold is associated with the other outer cavity to remove the spent fuel; and an oxidant manifold for introducing oxidant gas into the center cavity so that the oxidant gas flows through the holes in the center cavity across the cathode to the sides of the stack.

2. A solid oxide fuel cell stack as in claim 1 including a nickel felt layer between the anode of each rectangular fuel cell and the adjacent interconnect.

3. A solid oxide fuel cell as in claims 1 or 2 in which the interconnect metal is stainless steel.

4. A solid oxide duel cell as in claim 1 in which the fuel and oxidant manifold comprise holes in said interconnects and annular ceramic rings between the interconnects with their ends sealed to the adjacent interconnects.

5. A fuel cell assembly including a plurality of interconnected fuel cell stacks as in claims 1, 2, 3 or 4.

* * * * *